United States Patent [19]

Tokoro

[11] Patent Number: 4,594,811
[45] Date of Patent: Jun. 17, 1986

[54] HYDROPONIC PLANT CULTIVATION DEVICE

[75] Inventor: Toranosuke Tokoro, Tokyo, Japan

[73] Assignee: Dainichi Sangyo K. K., Tokyo, Japan

[21] Appl. No.: 687,801

[22] Filed: Dec. 31, 1984

[30] Foreign Application Priority Data

May 30, 1984 [JP] Japan ............................. 59-78571[U]

[51] Int. Cl.⁴ ............................................. A01G 31/02
[52] U.S. Cl. ...................................................... 47/65
[58] Field of Search ................... 47/59, 60, 61, 62, 63, 47/64, 65

[56] References Cited

U.S. PATENT DOCUMENTS

| Re. 21,820 | 6/1941 | Munsell | 47/63 |
|---|---|---|---|
| 2,189,510 | 2/1940 | Swaney | 47/63 |
| 2,928,211 | 3/1960 | Martin | 47/60 |
| 4,006,559 | 2/1977 | Carlyon, Jr. | 47/59 |
| 4,033,072 | 7/1977 | Kubayashi | 47/62 |
| 4,216,617 | 8/1980 | Schmidt | 47/62 |
| 4,250,666 | 2/1981 | Rakestraw | 47/65 |

Primary Examiner—Robert A. Hafer
Assistant Examiner—Bradley M. Lewis
Attorney, Agent, or Firm—Armstrong, Nikaido, Marmelstein & Kubovcik

[57] ABSTRACT

A hydroponic plant cultivation device is disclosed, wherein at least one rotating cultivation tower is arranged. The tower is formed by piling up a plurality of cultivation unit, each of which has a plurality of ports for allowing to receive and maintain a lower end of a plant to be cultivated, a nozzle for spraying a nutrient liquid therein, and a portion for accommodating a constant amount of the liquid to allow an overflow of any excess liquid to a lower cultivation unit. The nutrient liquid is measured on and adjusted in its concentration and pH and recycled between the tower and its supply source.

6 Claims, 6 Drawing Figures

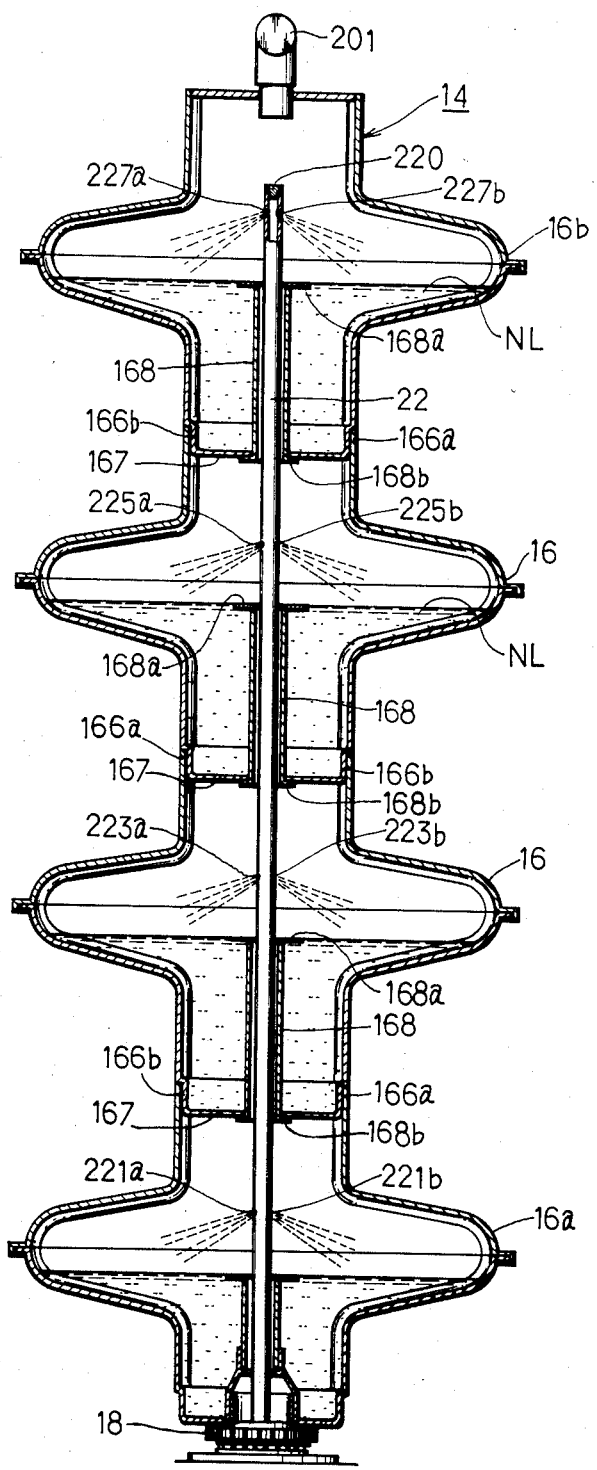

HYDROPONIC PLANT CULTIVATION DEVICE

BACKGROUND OF THE INVENTION

1. Field of the Invention

The present invention relates to a hydroponic plant cultivation device having a plurality of cultivation units which are vertically arranged to form a tower-like structure.

In recent years, it become gradually difficult to carry out with a reasonable efficiency a farming utilizing or basing soil, due to its inherent problems of that the soil does show a poor holding ability on chemical fertilizers, agricultural chemicals and the like to require a giving of such agents in a relatively large amount for attaining a good result in growth of a plant, that a good yield can not be expected, when a repeated cultivation of same plant will be carried out on same ground, even if various fertilizers shall be given, and that an introduction of modern farm machineries reduces concerned human labour but it does not always bring an increase in yield of the plant.

Therefore, a new type agricultural system, so-called "hydroponic cultivation" having no restriction on soil has been watched with a great interest.

2. Description of the Prior Art

A typical prior art hydroponic cultivation system has been arranged in a relatively large hothouse to carry out a large scale cultivation. Such a system has disadvantages in that an apparatus for the system is too expensive, a relatively wide space is required for installing its apparatus, and a higher skill or technical knowledge is required for maintaining and conducting the system in best condition.

In order to overcome such and other disadvantages, Vincent P. Carl proposes in his U.S. Pat. No. 4,255,896 a compact hydroponic cultivation device, wherein a plurality of horizontal ducts are arranged in a triangular form in vertical section of the device, each of said ducts forming a flow path of a nutrient liquid and having planting cups which are detachably mounted thereto for supporting an inert media and a plant to be cultivated by the nutrient liquid.

Further, Ernst H. S. Sjostedt et al disclose in their U.S. Pat. No. 4,245,433 a system for regulating a pH value of a nutrient liquid which is to be circulated to cultivate a plant.

SUMMARY OF THE INVENTION

The present invention provides a hydroponic plant cultivation device which has a simple structure and is compact in size but has a good cultivation efficiency.

The device according to the present invention can be handled by any person without any skill and may be installed in a small space, such as a porch, sunny room, garden and the like. Therefore, the device is particularly suitable in a home use or to install on a ship to self-support vegitables, fruits or the like fresh foods.

The device of the invention is basically composed of a cultivation tower formed by a plurality of cultivation units, each of which has at an upper portion thereof at least one window for a plant to be cultivated, a chamber for accommodating a nutrient liquid therein to give nutrients to the plant and means to allow an overflow of an excess amount of the liquid to maintain a liquid level in the chamber constant; piping means arranged vertically in the cultivation tower through each of the cultivation units and having a plurality of nozzles, each of which is arranged in each of said cultivation units; a nutrient liquid source connected to said piping means for giving the liquid to each chamber of said cultivation units and communicated to a space formed below a bottom of lowermost cultivation unit in said cultivation tower to recover liquid overflowed therefrom; pump means for feeding the liquid from said nutrient liquid source to said piping means to cause a liquid circulation through said cultivation tower; and means for rotary driving said cultivation tower and actuating said pump means.

The device may further comprise a base structure for mounting the cultivation tower and accommodating therein the nutrient liquid source and the pump means, as well as a support structure mounted on the base structure and fittingly engaged with an upper end of uppermost cultivation unit to stably maintain the cultivation tower in position.

It is preferable that each of the cultivation unit has a lamp-shade like outer appearance and is fittingly piled up to form the cultivation tower. Each nozzle in the piping means may be formed as one or more openings at a level above the liquid level in the chamber of the concerned cultivation unit. Each of the cultivation unit may be composed of a lower structural element forming the chamber to accommodate the nutrient liquid therein and having a hollow cylindrical member to allow the overflow of the liquid, and an upper structural element having at a shoulder portion thereof the window for the plant and fittingly mounted on the lower structural element, said window being covered with a lid which has one or more ports adapted to receive the plant therethrough. The hollow cylindrical member is vertically secured at a central portion of the lower structural element in the concerned cultivation unit and arranged concentrically to the piping means in the cultivation tower to form an annular space as a liquid overflowing passage between an inner surface thereof and an outer surface of the piping means.

BRIEF DESCRIPTION OF THE DRAWINGS

An embodiment of a hydroponic plant cultivation device according to the present invention is illustrated in the drawings, in which

FIG. 3 is a vertical section of a cultivation tower which forms an essential part of the device;

DETAILED DESCRIPTION OF THE PREFERRED EMBODIMENT

Figure 1:
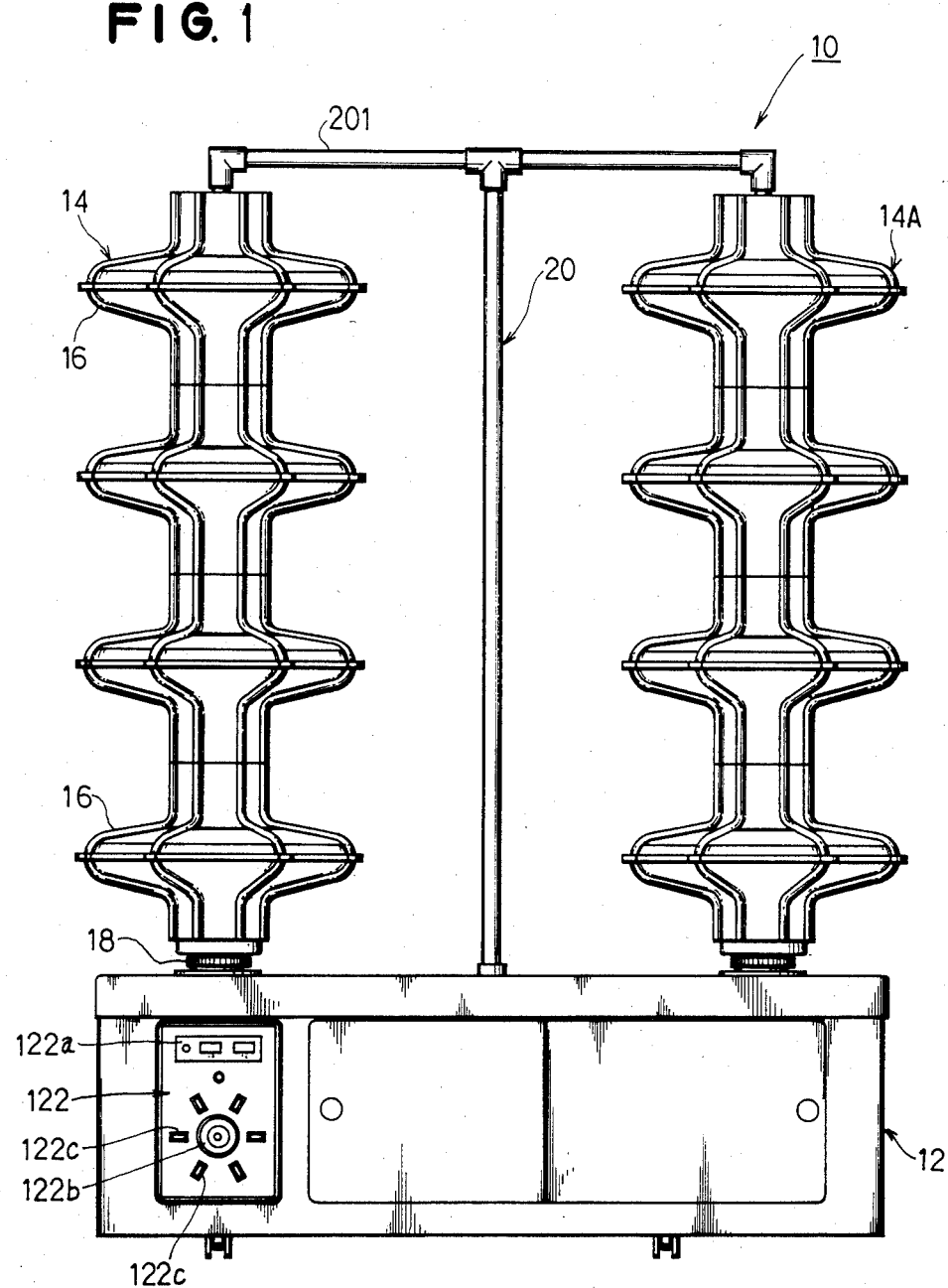
FIG. 1 is a front elevational view of the device.

Referring to FIG. 1, there is shown a hydroponic plant cultivation device generally designated by reference numeral 10, which comprises a base structure 12 having a box-like configuration, a cultivation tower 14 or 14A which is formed by piling up four cultivation units 16, 16, ..., said tower being mounted on the base structure 12 through a mechanism 18 for rotary driving the tower 14, and a support structure 20 planted to the base structure 12 and having an arm-like member 201 to support a head of the cultivation tower by engaging with a lid for an uppermost cultivation unit 16 (see 16b in FIG. 3). The illustrated device 10 has two cultivation towers 14 and 14A but those are same with each other and thus an explanation of the tower 14A will not be given for the sake of simplicity.

Figure 2:
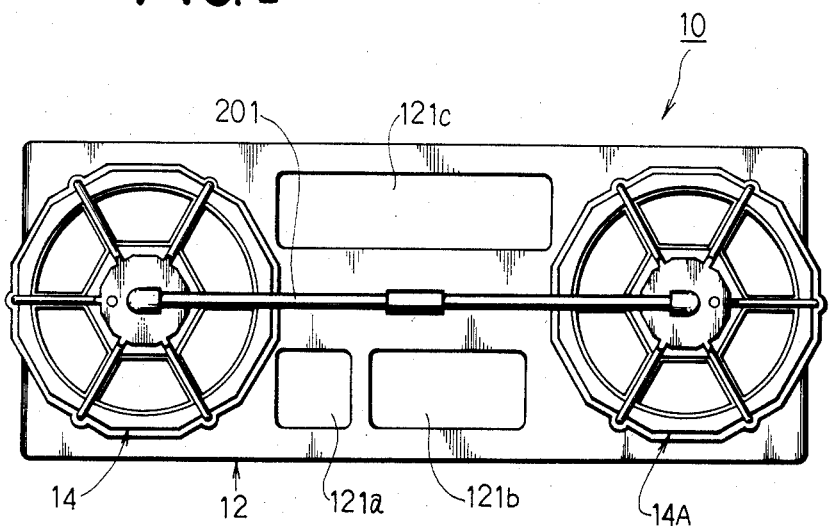
FIG. 2 is a top plan view of the device shown in FIG. 1.

As shown in FIG. 2, there are formed cavities 121a, 121b and 121c in an upper area of the base structure 12, which are employed as for a germination bed, transplantation bed and nursery, respectively. It is possible to control a temperature in the germination bed 121a to facilitate a germination of a seed accommodated therein. The nursery 121c may have a compact sized compressor (not shown) to supply dissolved oxygen to seedlings planted therein.

Figure 4:
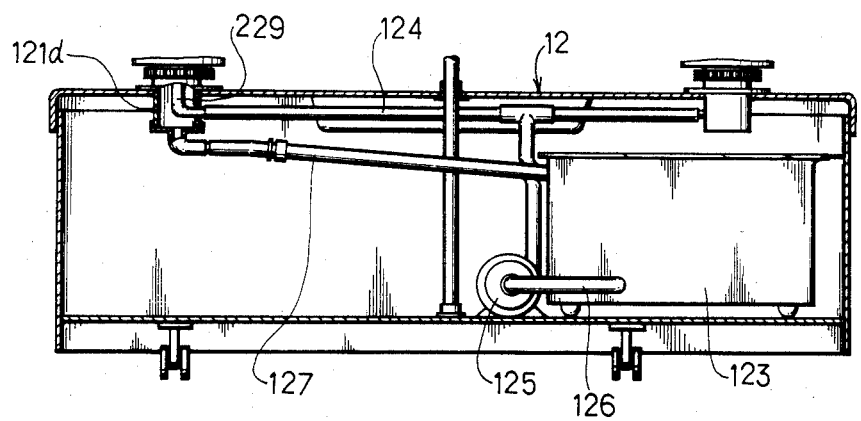
FIG. 4 is a vertical section of a base structure of the device, to show members accommodated therein.

As shown in FIG. 3, a pipe 22 is vertically arranged in a central portion of the cultivation tower 14. The pipe 22 extends from a portion near a bottom of the lowermost cultivation unit 16a to an upper portion of the uppermost cultivation unit 16b in the cultivation tower 14 and has four pairs of openings 221a, 221b, 223a, 223b, 225a, 225b, 227a, 227b, each of which serves as a nozzle for spraying out a nutrient liquid NL in a chamber of the concerned cultivation unit 16. An upper end opening of the pipe 22 is closed by a suitable means, for instance, with use of a plug 220 as shown. While, a lower end of the pipe 22 is connected to an elbow 229, as shown in FIG. 4, which is communicated to a reservoir 123 as a nutrient liquid supply source through a first duct 124, a liquid feeding pump 125 and a second duct 126, said members 123 to 125 being arranged in the base structure 12.

Figure 5:
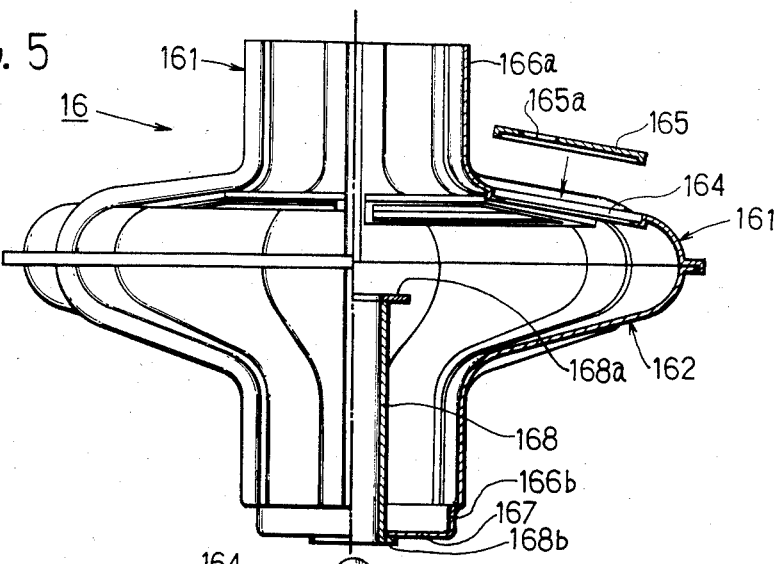
FIG. 5 is a front elevational view of a cultivation unit as a structural element for the cultivation tower shown in FIG. 3, a part thereof being shown in section to show an inner structure thereof.
Figure 6:
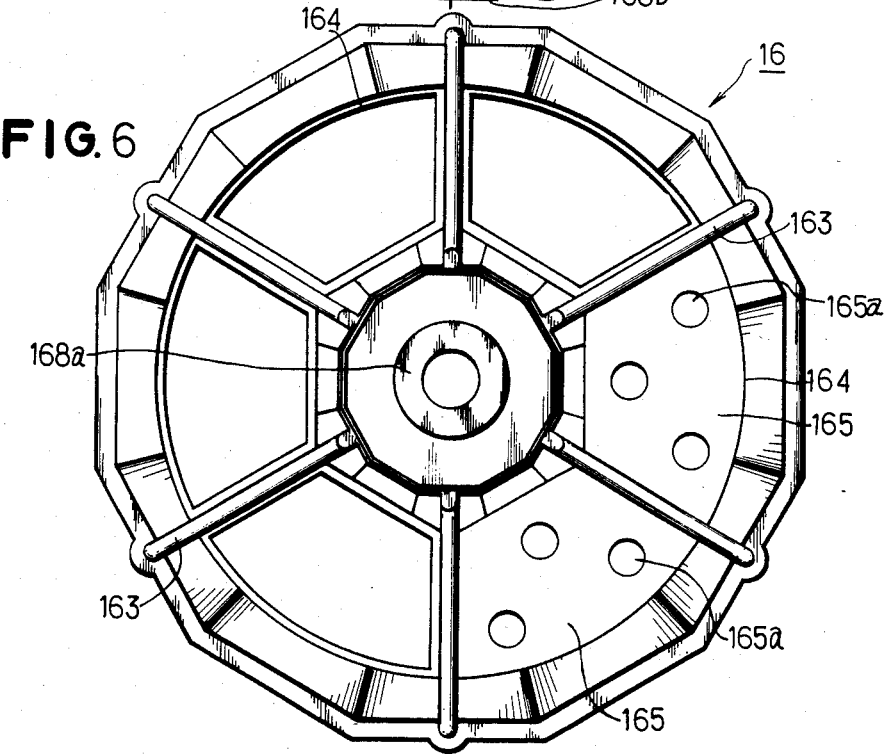
FIG. 6 is a top plan view of the cultivation unit shown in FIG. 5.

A structure of the cultivation unit 16 as the most important member for the device 10 will be explained in more detail with reference to FIGS. 5 and 6. The unit 16 has a lamp-shade like visual appearance as shown in the figures, has a polygonal form in horizontal section and is strengthen with ribs 163, 163 . . . . The unit 16 may be manufactured with use of a glass, synthetic resin or the like material and can be composed of two elements of an upper and lower structural elements 161 and 162, to make a moulding or the like manufacturing process therefor easy. The upper element 161 can be fittingly mounted on the lower element 162 to form the unit 16. On an upper portion of the cultivation unit 16, namely at a shoulder of the upper structural element 161, there are formed six windows 164, 164 . . . , each of which is covered with a lid plate 165 having a plurality of ports or openings 165a, 165a . . . to allow an insertion of a lower end portion of a plant (not shown) to be cultivated. A stem portion of the plant abutting to an edge of the port can, of course, be covered with a protecting material such as cotton, polyurethane foam sheet or the like. A lower end portion 166b of the lower structural element 162 is squeezed in diameter and an upper end portion 166a of the upper structural element 161 has an inner diameter to accept or accommodate such a squeezed lower end portion of the lower structural element, so that the lower end portion 166b of the lower structural element 162 can be fitted in an upper end portion of an upper structural element in a lower arranged cultivation unit, when the units are piled up to form the cultivation tower 14 as shown in FIGS. 1 and 3. The lower structural element 162 has a bottom 167 with a central opening, through which a hollow cylindrical member 168 is extended and a lower end thereof is secured to the bottom 167 of the lower structural element 162. In the illustrated embodiment, the hollow cylindrical member 168 has flanges 168a, 168b at each end but such flanges and more particularly the upper flange 168a is not always required. In this connection, please note that it is preferable to arrange the lower flange 168b for the hollow cylindrical member 168, so as to make the securing or adhering of the hollow cylindrical member 168 to the bottom 167 easy. An inner diameter of the hollow cylindrical member 168 is remarkably larger than an outer diameter of the pipe 22 (see FIG. 3) to loosely accommodate the pipe 22 therein and to form an annular space therebetween, which space serves as an overflowing passage of the nutrient liquid to be supplied in the chamber of the cultivation unit 16 from the reservoir 123 through the ducts 124, 126 (FIG. 4), pipe 22 and nozzles 221a, 221b, 223a, 223b, 225a, 225b, 227a, 227b (FIG. 3). As seen from FIGS. 3 and 4, a nutrient liquid overflowed from the lowermost cultivation unit 16 (16a in FIG. 3) is led to a liquid receptor 121d formed in the base structure 12 and recovered by the reservoir 123 through a recovering duct 127.

At the front side of the base structure 12, there is arranged a control panel 122 for operating the device 10, as shown in FIG. 1. On the control panel 122, there are provided with meters 122a for indicating a pH value and a concentration of the nutrient liquid in the reservoir 123 (FIG. 4), a timer 122b for controlling a starting and stopping of the liquid feeding pump 125 to automatically control a time schedule for the nutrient liquid circulation and various switches 122c, 122c . . . , each of which has a lamp incorporated therein for confirming an actuation thereof and serves to connect the device 10 with an electrical source (not shown), manually control the timer 122b, control a heater (not shown) for adjusting a temperature of the nutrient liquid in the reservoir 123, control other heaters (not shown) for adjusting temperatures in the cavities 121a and 121b as the germination and transplantation beds, and carry an ON-OFF control of the compressor for the cavity 121c as the nursery.

A manner for cultivating a plant with use of such device 10 will now be explained hereinafter.

In the first place, one of the switches 122c is pushed down to actuate the liquid supply pump 125 and the timer 122b is set appropriately to cause a proper nutrient liquid circulation for the cultivation of the selected plant. An operator then reads out the each value indicated in the meters 122a to check conditions of the nutrient liquid and if necessary, controls or adjusts the same. In this case, a properly controlled nutrient liquid in the reservoir 123 is fed by the liquid feeding pump 125 to the pipe 22 and sprayed from the concerned nozzle in each chamber of the cultivation unit 16 (see FIGS. 3 and 4). An excess amount of the liquid in each unit 16 overflows through the hollow cylindrical members 168 to a subsequent or lower arranged unit 16 and finally returned to the reservoir 123 to repeat such a nutrient liquid circulation.

Each seedling of the plant, which may be of that pre-cultivated with use of the various beds as designated as the cavities 121a, 121b, 121c (FIG. 2) and is protected at its stem portion with a polyurethane foam material, is inserted in the port 165a formed in the lid plate 165 to be arranged at the window 164 of the cultivation unit 16 (see particularly FIGS. 5 and 6), so that a root portion of the plant is immersed in the nutrient liquid accommodated in the chamber of the unit 16.

Thereafter, an electrical switch is pushed down to activate the mechanism 18 for rotary driving the cultivation tower 14, so as to attain a uniform growth of the plant to be cultivated.

Advantages or effects attained by the device according to the invention may be itemizedly listed as follows.

(a) The device has a tower-like structure and thus a space for installation thereof can be made minimum.

(b) The cultivation tower is formed by piling up any desired number of the cultivation units which have same or substantially same in size and are exchangeable with one another, so that the tower can easily be set in any height and a possibly damaged unit can easily be replaced with a fresh one.

(c) The cultivation tower is rotary driven to make a sunshine condition and the like various terms or factors constant for all plants.

(d) The concentration, pH value and other conditions of the nutrient liquid may automatically be adjusted to require no specific skill for carrying out the cultivation.

What is claimed is:

1. A hydroponic plant cultivation device comprising a cultivation tower formed by a plurality of cultivation units, stacked one unit on the other unit, each of said units having a lower structural element forming a chamber for accommodating a nutrient liquid therein to give nutrients to a plant to be cultivated and a hollow cylindrical member for allowing overflow of excess liquid to maintain the liquid level in said chamber constant, and an upper structural element having at a shoulder portion at least one window which is covered with a lid having at least one port for receiving the plant therethrough and fittingly mounted on the lower structural element; piping means arranged vertically in said cultivation tower through each of said stacked cultivation units having a nozzle arranged in each of said stacked cultivation units; a nutrient liquid source connected to said piping means for supplying liquid to each of said stacked cultivation units and communicated to a space below the bottom of the lowermost stacked cultivation unit in said cultivation tower for recovering liquid overflowed therefrom; pump means for feeding liquid from said nutrient liquid source to said piping means for causing liquid circulation through said cultivation tower; and means for rotary driving said cultivation tower and actuating said pump means.

2. A device as claimed in claim 1, wherein each of said cultivation units has a lamp-shade appearance and said units are fittingly stacked one on the other to form said cultivation tower.

3. A device as claimed in claim 1, wherein said cultivation tower is mounted on a base structure accommodating said nutrient liquid source and pump means.

4. A device as claimed in claim 1, wherein each nozzle in said piping means is at a level above the liquid level in the chamber of the concerned cultivation unit.

5. A device as claimed in claim 1, wherein said hollow cylindrical member is vertically secured at a central portion of the lower structural element of said cultivation unit and arranged concentrically to said piping means in said cultivation tower to form an annular space as a liquid overflowing passage between an inner surface thereof and an outer surface of said piping means.

6. A device as claimed in any one of claims 1 to 4, further comprising a support structure which is mounted on said base structure and fittingly engages with an upper end of the uppermost cultivation unit in said cultivation tower to stably maintain said tower in position.

* * * * *